United States Patent Office 2,816,100
Patented Dec. 10, 1957

2,816,100
CYANOETHYLATED LIGNIN

Harry M. Walker, Dickinson, Tex., assignor to Monsanto Chemical Company, St. Louis, Mo., a corporation of Delaware No Drawing. Application April 23, 1954,
Serial No. 425,305

2 Claims. (Cl. 260—124)

This invention relates to cyanoethyl ethers of lignin as novel compositions of matter and to a process for their preparation. More particularly, it pertains to the preparation of such nitrogenous ethers containing cyanoethyl groups by the reaction of acrylonitrile with lignin.

Lignin is a term often used generically to describe the principal non-cellulose portion of wood. Its chemical structure is not too well defined but it is generally conceded to be a polymeric substance characterized by a number of hydroxyl and methoxyl groups. There are many varieties of lignin depending upon the source material from which it is produced and the processes employed for isolation of the material. Generally, lignins are classified broadly as sulfite or alkali lignins depending upon the primary process from which the lignin is obtained as a byproduct. Sulfite lignins are obtained by barking and chipping the wood, and then converting it to pulp by cooking under pressure with a solution of a bisulfite and sulfur dioxide. During the cooking, the lignin dissolves and is thus made available in the sulfite waste liquid, usually in the form of lignosulfonates. Alkali lignin, on the other hand, is made from the waste liquor, the so-called "black liquor," of the sulfate and soda pulp processes. In the sulfate process, the wood is cooked with a mixture of sodium hydroxide and sodium sulfide. In the soda process, sodium hydroxide only is employed in cooking. The black liquor is then reduced to a point where sodium lignate separates out. This is then acidulated to yield free lignin. The alkali lignins are much simpler to make and comparatively pure forms, that is, products practically free of non-lignin constituents, are available on the market which vary only slightly in properties despite the diversity of woods from which they are made.

While a number of processes have been proposed in the art for the cyanoethylation of various hydroxyl-containing compounds, such as alcohols, phenols, cellulose and related materials, the art is silent on the subject of cyanoethylation of lignin and the products resulting therefrom. It is an object of the present invention, therefore, to provide as new compositions of matter, cyanoethyl ethers of lignin. It is a still further object of the invention to provide cyanoethyl ethers of lignin containing from about one to about four cyanoethyl groups per lignin unit. It is a still further object of the invention to provide a process for the preparation of such cyanoethyl ethers of lignin. Other objects of the invention will become apparent from the following description and the attached claims.

According to the invention, cyanoethyl ethers of lignin may be obtained by reacting lignin and acrylonitrile in the presence of a water-soluble, strongly basic hydroxide. In one specific embodiment of the invention, lignin is treated with an aqueous soultion of a water-soluble, strongly basic hydroxide and the resulting slurry is refluxed with acrylonitrile until the desired number of cyanoethyl groups are introduced. The cyanoethylated derivatives are useful as additives in the manufacture of rubbers, drilling muds, surface coatings, etc.

The invention is illustrated in the following examples, but these are not intended to limit it in any manner.

Example I

Approximately 2.2 g. of sodium hydroxide dissolved in 50 ml. of water and 25 g. of a commercial alkali lignin known to the trade as "Indulin A" were charged to a reaction flask equipped with a stirrer and a reflux condenser. The mixture was slurried, and heated to a temperature of 40–50° C. for 30 minutes. About 250 ml. of acrylonitrile was then added and the resulting mixture was refluxed at a temperature of about 73–74° C., with vigorous stirring, for 4.5 hours. Upon cooling, the reaction mixture separated into a solid phase and an acrylonitrile solution. These were separated by decantation of the acrylonitrile layer.

The solid material with a consistency like that of heavy molasses was dissolved in hot acetone. The solid was reprecipitated as a tarry material by the addition of water, steamed to remove all traces of acrylonitrile, dried, and comminuted to form a dark brown powder. This product contained 2.77% nitrogen by analysis. This value corresponds to 1.9 cyanoethyl groups per lignin unit. The product was soluble in alkali, as well as in acetone, but was insoluble in water.

Additional cyanoethylation product, with nearly the same solubility characteristics and somewhat greater nitrogen content, was recovered from the acrylonitrile layer mentioned above by addition of 500 ml. of dilute (0.1 N.) hydrochloric acid to precipitate the material followed by filtration, steaming to remove acrylonitrile, and drying.

Example II

Approximately 25 g. of the same commercial lignin employed in Example I was thoroughly mixed in a reaction flask with 25 ml. of a 4% sodium hydroxide solution and the resulting slurry was heated to 40–50° C. for 30 minutes. To this was added 250 ml. of acrylonitrile and the mixture was heated under reflux conditions for six hours. After the reaction mixture had cooled, the unreacted acrylonitrile was decanted from the solid material and the latter was dissolved in hot water, acidified, and steamed to remove any acrylonitrile. A heavy tarry material resulted which upon cooling hardened to a cake. The cake was crushed, washed with water, dried, and analyzed for nitrogen content. Kjeldahl analysis indicated 2.87% nitrogen which corresponds to 2 cyanoethyl groups per lignin unit. The product was soluble in acetone and alkali but insoluble in water.

Example III

The experiment of Example I is repeated except that potassium hydroxide is employed instead of sodium hydroxide. Comparable results are obtained.

Example IV

Instead of the sodium hydroxide employed in Example II, benzyl trimethyl ammonium hydroxide is employed in an experiment analogous to that of Example II. Cyanoethylation of lignin is effectively catalyzed by quaternary ammonium hydroxide and products comparable in character and nitrogen content to those in Examples I and II are obtained.

Any of the lignins available commercially may be employed in the process of the invention. However, the so-called alkali lignins as described above are to be preferred.

As the strongly basic, water-soluble hydroxide, there may be used the hydroxide of an alkali metal such as sodium or potassium hydroxide, a strongly basic quaternary ammonium hydroxide such as benzyl trimethyl ammonium hydroxide or dibenzyl diethyl ammonium hydroxide, or a mixture of such hydroxides. A slurry is usually made of the lignin and hydroxide employing about equal parts by weight of lignin and an aqueous solution of one or more hydroxides in the concentration range from about 2% to about 20%. Preferably, a caustic concentration of about 10% is employed. Concentrations in the upper range and those in excess of 20% tend to promote polymerization of the nitrile. Complete cyanoethylation of the lignin molecule requires six moles of acrylonitrile per lignin unit or a weight ratio of about 0.4 part of acrylonitrile per part of lignin. Additional amounts of acrylonitrile, however, may be used. In fact, a large excess of acrylonitrile in the weight ratio range from one to fifteen parts of acrylonitrile per part of lignin is helpful in promoting the reaction. Preferably, a weight ratio of 5 to 10 parts of acrylonitrile per part of lignin is employed. Such excess may be readily recovered with negligible losses when the reaction is completed. With excess acrylonitrile, the regulation of other variables becomes less important and higher temperatures and higher concentrations of hydroxide may be used to effect more complete cyanoethylation with a minimum loss of acrylonitrile due to polymerization, hydrolysis, etc.

The reaction is generally carried out at reflux temperature, i. e., from about 70 to about 80° C. at atmospheric pressure. However, it may be carried out at lower temperatures, i. e., down to atmospheric temperatures and even as low as 0° C. at the sacrifice of reaction time. Longer reaction periods are required at the lower temperatures. Higher temperatures at increased pressures may also be employed but are not recommended because of increased polymerization problems and the losses resulting therefrom. Reaction time is dependent upon the degree of cyanoethylation desired which in turn may be dependent on the end use of the cyanoethylated material. Reaction time may vary, therefore, over a wide range with longer times favoring more complete cyanoethylation. Generally, useful products are obtained by allowing the reaction to proceed over a period of from one to ten hours and preferably from about three to about six hours.

The cyanoethyl ethers of lignin obtained by the procedure described in the above examples contain about 1.5% to about 5% of nitrogen or from about 1 to about 4 cyano groups per lignin unit. Such cyanoethyl lignin ethers may be hydrolyzed upon treatment with alkaline or acid agents or water to produce chemical intermediates suitable for further reaction with other compounds such as, for example, polyols or polyamines, to form resinous materials. The ethers themselves exhibit a moderate degree of thermoplasticity.

What is claimed is:

1. Cyanoethyl ethers of lignin.
2. Cyanoethyl ethers of lignin containing from about 1.5% to about 5% nitrogen corresponding to from about one to about four cyanoethyl groups per lignin unit.

References Cited in the file of this patent

UNITED STATES PATENTS

| | | |
|---|---|---|
| 2,579,580 | Howk et al. | Dec. 25, 1951 |
| 2,610,954 | Raff et al. | Sept. 16, 1952 |
| 2,669,592 | MacGregor et al. | Feb. 16, 1954 |
| 2,680,113 | Adler et al. | June 1, 1954 |
| 2,724,632 | Weisberg | Nov. 22, 1955 |